United States Patent [19]

Suzuki et al.

[11] Patent Number: 4,621,322
[45] Date of Patent: Nov. 4, 1986

[54] CPU SELF-TEST SYSTEM INCLUDING THE CAPABILITY OF DISCONNECTING A FAULTY CPU FROM THE COMMON BUS OF A PLURAL CPU SYSTEM

[75] Inventors: Tadashi Suzuki; Hitoshi Takeda; Norimasa Kishi, all of Yokosuka, Japan

[73] Assignee: Nissan Motor Company, Limited, Yokohama, Japan

[21] Appl. No.: 349,844

[22] Filed: Feb. 18, 1982

[30] Foreign Application Priority Data

Feb. 25, 1981 [JP] Japan .................. 56-25461

[51] Int. Cl.[4] .............................. G06F 11/22
[52] U.S. Cl. .............................. 364/200
[58] Field of Search ......... 364/184, 186, 200, 900, 364/200 MS File, 900 MS File; 371/16, 58, 66, 59, 67, 11, 68

[56] References Cited

U.S. PATENT DOCUMENTS

| | | | |
|---|---|---|---|
| 4,145,734 | 3/1979 | Bienvenu | 364/200 |
| 4,181,940 | 1/1980 | Underwood et al. | 364/200 |
| 4,191,996 | 3/1980 | Chesley | 364/200 |
| 4,306,288 | 12/1981 | Nakamura | 364/200 |
| 4,356,546 | 10/1982 | Whiteside et al. | 371/67 |
| 4,402,507 | 8/1983 | Itou et al. | |
| 4,412,281 | 10/1983 | Works | 364/200 |

FOREIGN PATENT DOCUMENTS 2414755 8/1979 France .
2447577 2/1980 France .
2440032 5/1980 France .

OTHER PUBLICATIONS

D. Rennels, "Reconfigurable . . . Processing", *Computer*, vol. 11, No. 7 (Jul. 1978), pp. 49-59.

*Primary Examiner*—Thomas M. Heckler
*Attorney, Agent, or Firm*—Schwartz, Jeffery, Schwaab, Mack, Blumenthal & Evans

[57] ABSTRACT

In a multiple computer system in which a plurality of computer stations are connected for mutual data transfer via a common data bus, at least one computer station is provided with a fail safe facility which prevents disruption of the entire system due to malfunction of the computer station. The computer is preprogrammed to perform an input/output circuit diagnosis routine after power-up and before control program execution which causes the input/output circuit to output a coded pulse train signal. An abnormality detection circuit receives the coded pulse signal, converts it to a parallel-bit word, and compares the derived word to a stored, predetermined word. If the words match, the detection circuit causes a switching circuit to connect the computer to the common data bus; otherwise, the computer remains disconnected from the rest of the multiple computer system.

5 Claims, 4 Drawing Figures

CPU SELF-TEST SYSTEM INCLUDING THE CAPABILITY OF DISCONNECTING A FAULTY CPU FROM THE COMMON BUS OF A PLURAL CPU SYSTEM

BACKGROUND OF THE INVENTION

1. Field of the Invention

The present invention relates generally to a multiple computer system which shares a common data bus and more particularly to a multiple computer system in which the data output circuit of at least one computer station can be disconnected in terms of hardware and software from the common data bus and checked to see if there is an abnormality within the computer unit of the computer station, so that the failure of the entire system can be prevented.

2. Description of the Prior Art

A system has been proposed in which a common data bus serves a plurality of computer stations connected in parallel for the transfer of data between different computer stations in a time-share mode.

Such a multiple computer system comprises a plurality of computer stations each having a computer unit capable of performing a sharable independent control facility, a common data bus with which each computer station is connected in parallel for transferring resultant data among the computer stations, DC power supply, power switch, and ground line.

Recently, various microcomputer systems have been mounted in automotive vehicles for electronically controlling the overall operation of the internal combustion engine, air conditioner, seat position, etc., of an automotive vehicle.

In such a multiple computer system, if an abnormality occurs during execution of a program within any of the stations, the entire system may become "hung up" since incorrect data transfer will be carried out throughout the system.

Especially, the data output circuit of each computer unit is susceptible to voltage surge from the common data line developed by other electrical apparatus, e.g., an engine ignition system, solenoid coil type valves, a motor, etc.

To protect the data output circuit from voltage surges as described above, a shielded wire is used for each signal line of the common data bus in conjunction with a surge absorber.

However, if an excessively high voltage surge is developed and applied to a computer unit, e.g., when the automotive vehicle in which such a system is mounted is struck by lightning or passes near high-voltage cable lines, such voltage surges can disturb the input or output circuit of the computer unit and accordingly the normal data transfer among the stations becomes impossible due to the hardware failure of the output circuit even though program execution is performed normally. Consequently, the entire computer system can be hung up due to a hardware defect within the output circuit of any one computer unit.

SUMMARY OF THE INVENTION

It is an object of the present invention to provide a new multiple computer system with a common data bus in which a computer unit is disconnected from the common data bus before starting a regular control program, the output circuit of the disconnected computer unit is commanded to output a predetermined coded pulse signal, and the computer unit is connected again to the common data bus if the output code pattern is correct, so that hang-up of the entire system due to a hardware defect in the data output circuit in any of the computer units can be effectively prevented.

BRIEF DESCRIPTION OF THE DRAWINGS

The features and advantages of the present invention will be better appreciated from the following description taken in conjunction with the accompanying drawings in which like reference numerals designate corresponding elements, and in which.

DETAILED DESCRIPTION OF THE PREFERRED EMBODIMENTS

Reference will be made to the drawings and first in FIG. 1 which is a simplified block diagram of a multiple computer system.

Figure 1:
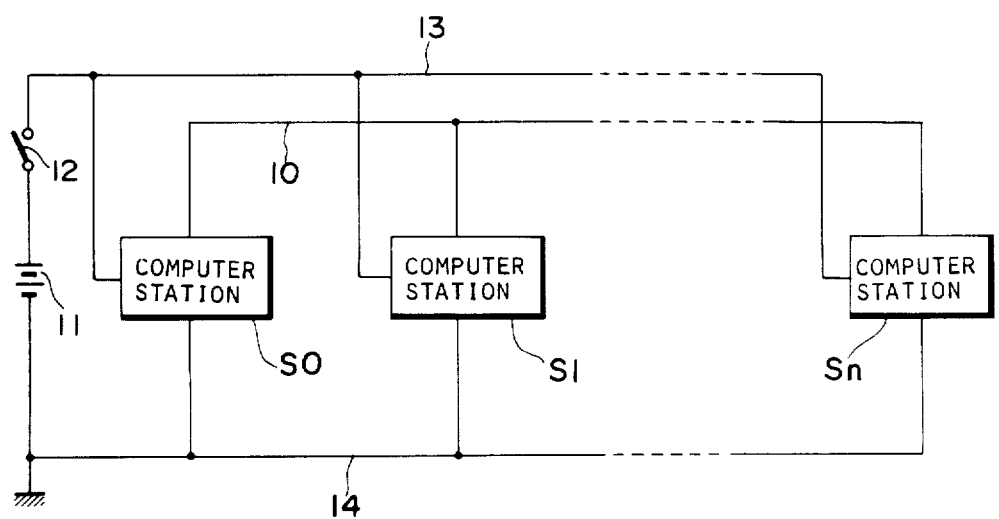
FIG. 1 is a block diagram of a multiple computer system which uses a common data bus in a time-share mode.

In FIG. 1, symbols $S_0$, $S_1$, $S_2$ . . . , and $S_n$ denote computer stations, each having an independent control facility. Each station $S_0$ through $S_n$ is connected to a common data bus so that data transfer can be carried out among the stations. For example in an engine control system, the result data obtained at the station $S_0$ is transferred to the station $S_1$ where an engine controlling signal is outputted on a basis of the result data from the station $S_0$. Numeral 11 denotes a DC power supply such as a battery, numeral 12 a power switch, numeral 13 a power supply line, and numeral 14 denotes a ground line.

Figure 2:
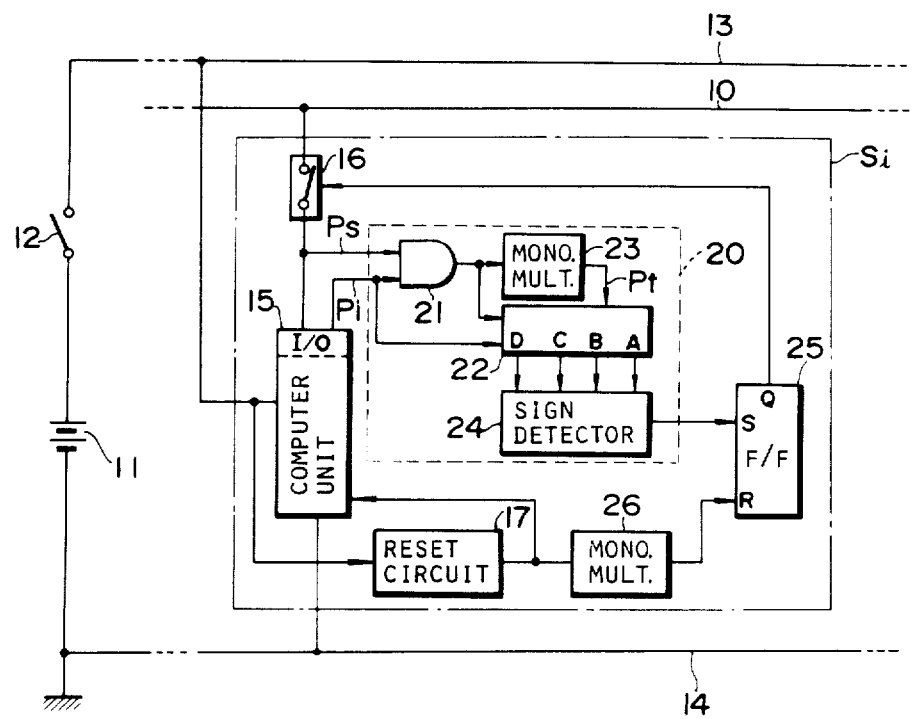
FIG. 2 is a block diagram of a preferred embodiment according to the present invention.

FIG. 2 is a block diagram of an individual station shown in FIG. 1 showing a preferred embodiment in which a fail safe facility is provided to prevent the multiple computer system from hanging the system up due to a failure of both hardware and software.

As shown in FIG. 2, each computer station comprises: a computer unit 15, e.g., having a Central Processing Unit (CPU), Read Only Memory (ROM), Random Access Memory (RAM), and data I/O circuit; a switching circuit 16 which serves as means for connecting the computer unit 15 to the common data bus 10; a reset circuit 17; and an abnormality detection circuit 20. As shown in the timing chart of FIG. 3, when the power switch 12 is turned on at time $t_1$, DC voltage from the DC power supply 11 is applied across the computer station $S_i$. At time $t_2$ after a predetermined period of time has passed, the reset circuit 17 outputs a "H" (high) level signal to the computer unit 15 to activate an initial reset to start a program.

The abnormality detection circuit 20 comprises: (a) an AND gate 21 which inputs coded pulses $P_s$ from the data input/output circuit of the computer unit 15 and an abnormality detection enable signal $P_i$ which enables the abnormality detection circuit 20; (b) a shift register 22 which latches and converts to parallel output the coded pulses $P_s$ from the AND gate 21; (c) a first monostable multivibrator 23 which provides a shift timing signal for the shift register 23; and (d) a sign detector 24 which outputs a "H" level signal when the coded pulse latched by the shift register 22 indicates a predetermined bit code. The computer station $S_i$ further comprises a R/S-flip-flop circuit 25 (hereinafter simply referred to as a RS-F/F) as a means for driving the switching circuit 16. The set terminal S of the RS-F/F 25 is connected to the output terminal of the abnormality detection circuit 20 and reset terminal R thereof is connected to a second monostable multivibrator 26 which outputs a pulse having a predetermined duration in response to a rising edge of the output signal to a "H" level of the reset circuit 17. The switching circuit 16 turns on when the output Q of the RS-F/F 25 turns to a "H" level in response to the "H" level input into the set terminal S thereof. Conversely, the switching circuit 16 turns off when the output Q of the RS-F/F 25 turns to a "L" level in response to the "H" level input into the reset terminal R thereof.

The circuit operation is described hereinafter with reference to FIG. 3.

As a prerequisite, an output program for outputting the fault diagnostic coded pulses $P_s$ and the abnormality detection enable signal $P_i$ to be executed prior to the control program must be included in an initial part of a program loaded in the computer unit 15.

In the above-described state, when the power switch 12 is turned on at time $t_1$, DC voltage is supplied to all of the computer stations via the power supply line 13. The output level of the reset circuit 17 incorporated in the computer station $S_i$ goes high ("H" level) at time $t_2$ after a predetermined warm-up period for the entire system has passed and the initial reset is applied to the computer unit 15 to start the control program.

At the same time, the second monostable multivibrator 26 outputs a reset pulse in response to the "H" level output from the reset circuit 17 so that the RS-F/F 25 is reset. The Q output of the RS-F/F turns to a "L" level to turn off the switching circuit 16. Consequently, the switching circuit 16 disconnects the computer unit 15 from the common data bus 10.

In response to the "H" level output from the reset circuit 17, the computer unit 15 executes the initializing program, i.e., outputting the abnormal detection enable signal $P_i$ to enable the AND gate 21 at time $t_2$ and simultaneously preparing of the fault diagnostic coded pulses $P_s$.

Figure 3:
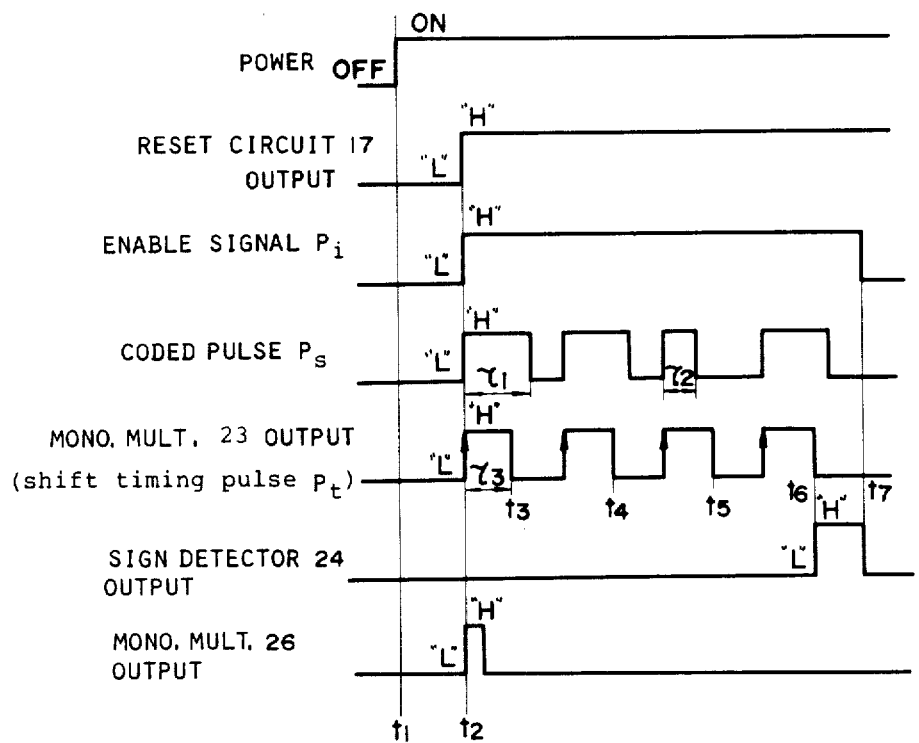
FIG. 3 is a timing chart of the signals of the circuit of the computer station shown in FIG. 4.

As shown in FIG. 3, the fault diagnostic coded pulses $P_s$ is in a form of a serial pulse signal which combines coded bit pulses of different pulse widths such as $\tau_1$ and $\tau_2$ ($\tau_1 > \tau_2$). When each coded pulse $P_s$ is outputted from the AND gate 21, the first monostable multivibrator 23 produces and outputs a timing pulse $P_t$ having a pulse width $\tau_3$ ($\tau_1 > \tau_3 > \tau_2$) to the shift register 22. The shift register 22 inputs each coded pulse $P_s$ from the AND gate 21 in synchronization with the falling edge of each timing pulse $P_t$ and converts and outputs the coded pulses $P_s$ in the form of a four-parallel-bit type.

The parallel output of the shift register 22 at times $t_2$, $t_3$, ..., $t_6$ upon receipt of the coded pulses $P_s$ is shown in a table described hereinbelow.

| Time | Bit | | | |
|---|---|---|---|---|
| | A ($2^3$) | B ($2^2$) | C ($2^1$) | D ($2^0$) |
| $t_2$ | "L" ("0") | "L" ("0") | "L" ("0") | "L" ("0") |

-continued

| Time | Bit | | | |
|---|---|---|---|---|
| | A ($2^3$) | B ($2^2$) | C ($2^1$) | D ($2^0$) |
| $t_3$ | "L" ("0") | "L" ("0") | "L" ("0") | "H" ("1") |
| $t_4$ | "L" ("0") | "L" ("0") | "H" ("1") | "H" ("1") |
| $t_5$ | "L" ("0") | "H" ("1") | "H" ("1") | "L" ("0") |
| $t_6$ | "H" ("1") | "H" ("1") | "L" ("0") | "H" ("1") |

When the sign detector 24 is designed to generate a high ("H") level output upon receipt of the combination input in the form of (H, H, L, H) from the shift register 22, the sign detector 24 at the time of $t_6$ outputs the "H" level signal to the RS-F/F 25 which is still in the reset state. The RS-F/F 25 is then set in response to the "H" level signal from the sign detector 24. The Q output of the RS-F/F 25 turns to the "H" level to turn on the switching circuit 16, so that the computer unit 15 is connected to the common data bus 10. The abnormal detection enable signal $P_i$ turns again to the "L" level, so that the shift register 22 is reset and the parallel output turns to all "L"s. Consequently, the sign detector 24 turns again to the "L" level and the computer unit 15 performs the original program control.

In other words, if there is no abnormality in the data input/output circuit of the computer unit 15, the computer unit 15 disconnected from the common data bus which has executed the abnormality detection processing described above is connected to the common data bus 10 after ensuring that the coded pulses $P_s$ are correctly outputted so that data transfer to the other computer stations can be performed.

In other words, if there is an abnormality in the data input/output circuit of the computer unit 15 due to voltage surge, etc., coded pulses $P_s$ as shown in FIG. 3 may not be outputted or the shift register 22 may not output the predetermined coded bits shown in the table due to the disturbed waveform of some coded bit even if the coded pulse appears. In this case, the high level output from the sign detector 24 will not be obtained so that the RS-F/F 25 remains reset. Consequently, a computer station with a defective data input/output circuit will remain disconnected from the common data bus 10 and will not transfer erroneous data to another computer station, so that hang up of the entire system can be prevented.

Figure 4:
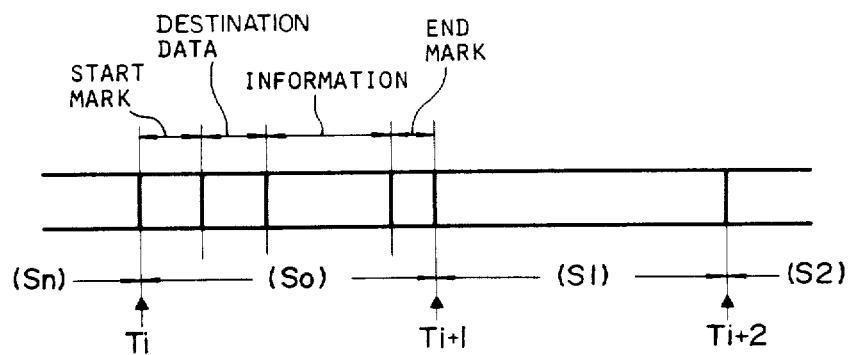
FIG. 4 is an example of data format used during data transfer via the common data bus in the multiple computer system of the peferred embodiment shown in FIG. 2 according to the present invention.

Furthermore, the data transfer among the computer stations of the multiple computer system according to the present invention, as shown in the data format chart of FIG. 4, is such that the use of the common data bus is allocated in a time-share mode to each computer station $S_0$ through $S_n$ and the data format comprises a start mark, destination data, information, and an end mark. The data format is so constructed as described above that there will be no effect on the data transfer to other normal computer stations if there is a computer station that is disconnected from the common data bus due to its malfunction.

When there is a computer station disconnected from the common data bus due to malfunction, such a computer station can be easily identified since no other station will receive data from that computer station during its allocated time. Consequently, its data handling duties can be backed up by a normally-functioning computer station.

The failsafe facility can thus be used for both software and hardware failures, by temporarily disconnecting the computer station from the common data bus after detecting abnormality in program execution.

As described above, according to the present invention, there is provided a failsafe facility within each computer station connected to the common data bus outputting fault diagnostic coded pulses before starting the control program, with the computer station disconnected from the common data bus, judging whether the correct code pulses are outputted, and disconnecting the computer station from the common data bus if not. Consequently, the following problems can securely be prevented; the inability to transfer data between the other computer stations due to a failure of the input/output circuit of one computer station, and hang up of the entire system due to erroneous data transfer to an other computer station. In addition, since the disconnection of the malfunctioning computer station from the common data bus can be performed in a short time before executing a control program, there can be almost no delay of control program start-up. Since the malfunctioning computer station disconnected from the other normal computer stations can be cooperatively associated with one of the normal computer stations, program control functions allocated to the abnormal computer station can be backed up and the disconnection of the malfunctioning computer station from the other computer stations need not disturb data transfer among the other normal computer stations.

It will be understood by those skilled in the art that the foregoing description is in terms of preferred embodiments of the present invention wherein various changes and modifications may be made without departing from the spirit and scope of the present invention, which is to be defined by the appended claims.

What is claimed is:

1. A multiple computer system adapted to be connected to a power source and comprising a plurality of computer stations, each of said plurality of computer stations being capable of executing a control program and of using a common data bus to transfer data between itself and other computer stations, each of said plurality of computer stations comprising:
    (a) a computer unit within each computer station, each computer unit responsive to initial receipt of power from said power source to disconnect same from said common data bus and to start execution of an initialization program for generating a coded pulse train unique to each computer unit and an enable signal;
    (b) a code detection circuit, within said computer station, said code detection circuit receiving said coded pulse train and generating a signal in response to said enable signal when said coded pulse train corresponds to a predetermined pulse train; and
    (c) means, responsive to said signal from said code detection circuit, for connecting the computer station to the common data bus, and responsive to the absence of said signal for disconnecting the computer station from the data bus.

2. A multiple computer system including a plurality of computer stations and a common data bus by means of which each computer station may communicate with one of the other computer stations, each computer station comprising:
    (a) a computer unit connected to a power supply and having an input/output unit and means for storing an initialization program to be executed prior to execution of a given control program;
    (b) a reset circuit connected to the power supply which initially resets said computer unit a predetermined time after the power supply is switched on to cause said computer unit to start execution of the initialization program;
    (c) a switching circuit which disconnects the input/output unit of said computer unit from the common data bus when the reset circuit initially resets said computer unit;
    (d) an abnormality detection circuit which receives an enable signal from the input/output unit of said computer unit and simultaneously receives a predetermined coded pulse train signal from the input/output unit of said computer unit when said computer starts execution of the initialization program in response to the initial reset from said reset circuit, converts said predetermined coded pulse train signal into a parallel data signal in synchronization with the pulse train signal, determines whether the parallel converted data signal coincides with predetermined code data, and outputs a pulse signal to said switching circuit to connect the input/output unit of said computer unit to the common data bus when the parallel converted data signal coincides with the predetermined code data, and outputs no signal to said switching circuit to maintain disconnection of the input/output unit from the common data bus when the parallel converted data signal does not coincide with the predetermined code data.

3. The multicomputer system according to claim 2, wherein said switching circuit comprises an analog switch connected between the input/output unit and common data bus for connecting the input/output unit to the common data bus when the analog switch is closed and for disconnecting the input/output unit from said common data bus when said analog switch is open, the switching circuit further comprising a flip-flop circuit which outputs a signal to said analog switch to open said analog switch when the signal outputted from said reset circuit is received and no signal from said abnormality detection circuit is received and outputs an inverted signal to said analog switch to close said analog switch when the pulse signal outputted from said abnormality detection circuit is received.

4. The multicomputer system according to claim 2, wherein said common data bus is allocated to each computer station in a time-shared mode for communicating with one of the other computer stations so that when there is a computer station which is not connected to said common data bus during the allocated time therefor, one of the other computer stations attempting to communicate with the disconnected computer station recognizes that the disconnected computer station has failed.

5. A method of self-testing for a self-sufficient computer station adapted to be part of a multiple computer system, executing a control program, and using a common data bus to transfer data with the data input/output circuits of other computer stations, comprising the steps taken by the computer station of:
    (a) disconnecting itself from the common data bus in response to an initial provision of operational power;
    (b) commanding itself to output a predetermined coded pulse and an enable signal;
    (c) determining in response to said enable signal whether the predetermined coded pulse has been output; and
    (d) reconnecting itself with the common data bus if it determines in step (c) that the predetermined coded pulse has been output.

* * * * *